Patented Sept. 29, 1925.

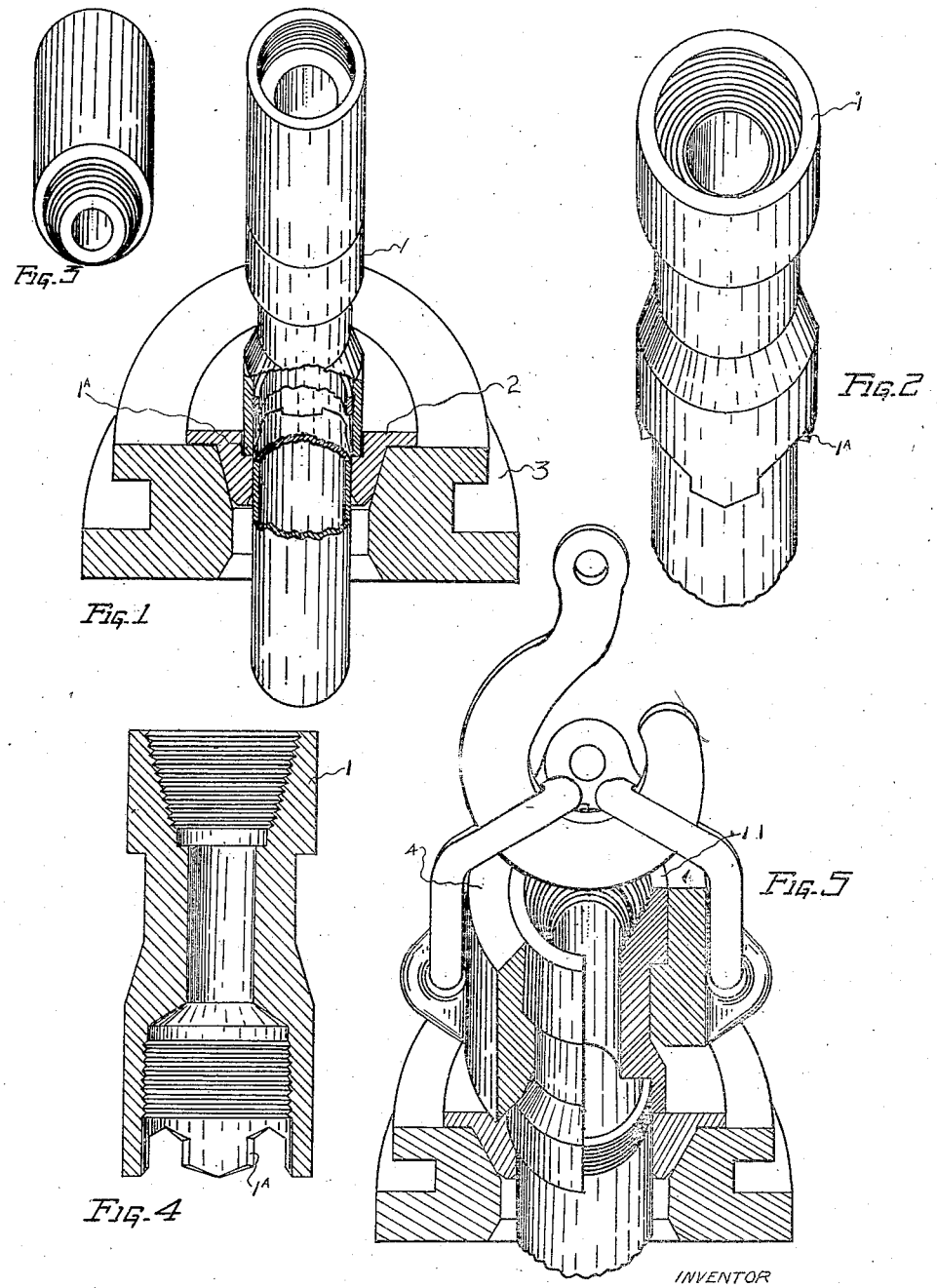

1,555,206

UNITED STATES PATENT OFFICE.

RICHARD D. HILL, OF WICHITA FALLS, TEXAS, ASSIGNOR OF ONE-THIRD TO JOHN M. SPELLMAN, OF DALLAS, TEXAS.

PIPE TOOL JOINT.

Application filed March 15, 1924. Serial No. 699,527.

*To all whom it may concern:*

Be it known that I, RICHARD D. HILL, a citizen of the United States, and a resident of Wichita Falls, in the county of Wichita and State of Texas, have invented new and useful Improvements in Pipe Tool Joints; and I do declare the following to be a full, clear, and exact description of the invention, such as will enable others skilled in the art to which it appertains to make and use the same.

My invention relates to pipe or drill stem tool joints for use in connection with rotary well drilling, and it is my principal object to provide a tool joint that will enable the attaching of pipe elevators while the bottom of the tool joint is resting on the slips in a rotary drilling table.

Another object is to provide a tool joint with notched portions in the lower end thereof to engage teeth in rotary bushings, thus eliminating the necessity of using a wrench on the lower tool joint for unscrewing the joints, the rotary bushing above mentioned being described and claimed in another application.

Further objects and advantages of the invention will be apparent as the invention is more fully described.

With the foregoing in view, the invention resides in the novel subject matter hereinafter described and claimed, the description being supplemented by the accompanying drawing, wherein, Figure 1 is a partly sectioned perspective view showing notched teeth on the lower end of the lower tool joint engaged in notches in rotary bushing.

Figure 2 is a perspective view showing the lower tool joint attached to a pipe.

Figure 3 is a perspective view of the upper tool joint as commonly used in connection with rotary well drilling.

Figure 4 is a centrally sectioned view of the lower tool joint.

Figure 5 is a partly sectioned perspective view showing the circumferential groove engaging pipe elevators.

The invention comprises the lower tool joint 1, having an exterior groove circumferentially thereof intermediate its ends where pipe elevators may be attached, the lower portion of said groove tapering downwardly to the larger diameter of the tool joint, the upper portion of the lower tool joint is tapered and threaded as shown to engage the tapered threaded portion of the top tool joint, and having a centrally disposed longitudinal aperture the length thereof to enable water to pass through the tool joints while drilling, the ends of the tool joints opposite the tapered threaded portions are enlarged internally and threaded so as to screw over the end of pipe or drill stem. The lower end of the lower tool joint is notched to provide teeth thereon, as shown at 1ª, for the purpose of engaging notches in the rotary bushing 2, which are disposed in the rotary table 3, thus preventing the lower tool joint from slipping circumferentially in the bushing 2 when the rotary table 3 is being rotated, and also preventing downward slippage of the lower tool joint and the drill pipe, which is attached thereto. This tool joint is specially adapted for rotary slips having vertical notches in the top thereof, as aforementioned. However, the tool joint may be used without the notched teeth on the bottom thereof, by using a wrench thereon to prevent circumferential slippage in the rotary bushing and allowing the bottom of the lower tool joint to rest on the top of the bushing, as shown in Figure 5, the circumferential groove in the lower tool joint provides means for attaching the pipe elevator 4.

The type of tool joint as heretofore used necessitated bushing having internal circumferential grooves to grip the drill pipe and elevate the lower tool joint above the rotary table to enable attaching pipe elevators, whereas, with the tool joint as provided in this invention, having the circumferential groove intermediate its ends, pipe elevators are enabled to be attached to the tool joint when the bottom thereof is resting on the bushing in the rotary table, thus eliminating the internally grooved bushing. The internally grooved bushing as heretofore used have a tendency to cut and deteriorate the drill pipe.

It is believed from the foregoing description that the nature and advantages of the invention will be readily apparent, however, I wish to indicate clearly in the record that I do not limit myself to the specific construction herein shown and described, and that such changes may be resorted to, when desired, as fall within the scope of what is herein claimed.

What I claim is:

In combination with the notched bushing of a rotary drilling table, a cylindrical member having a central bore, one end of which is enlarged, the said enlarged end of the said member being threaded and formed with a series of cut-outs which transversely extend through the member to form a series of teeth, said teeth meshing with said notches in the bushing to prevent slipping of the cylindrical member; and a drill pipe threaded into said threaded enlarged end of said cylindrical member and engaged with the inner side faces of the teeth thereof.

RICHARD D. HILL.